UNITED STATES PATENT OFFICE.

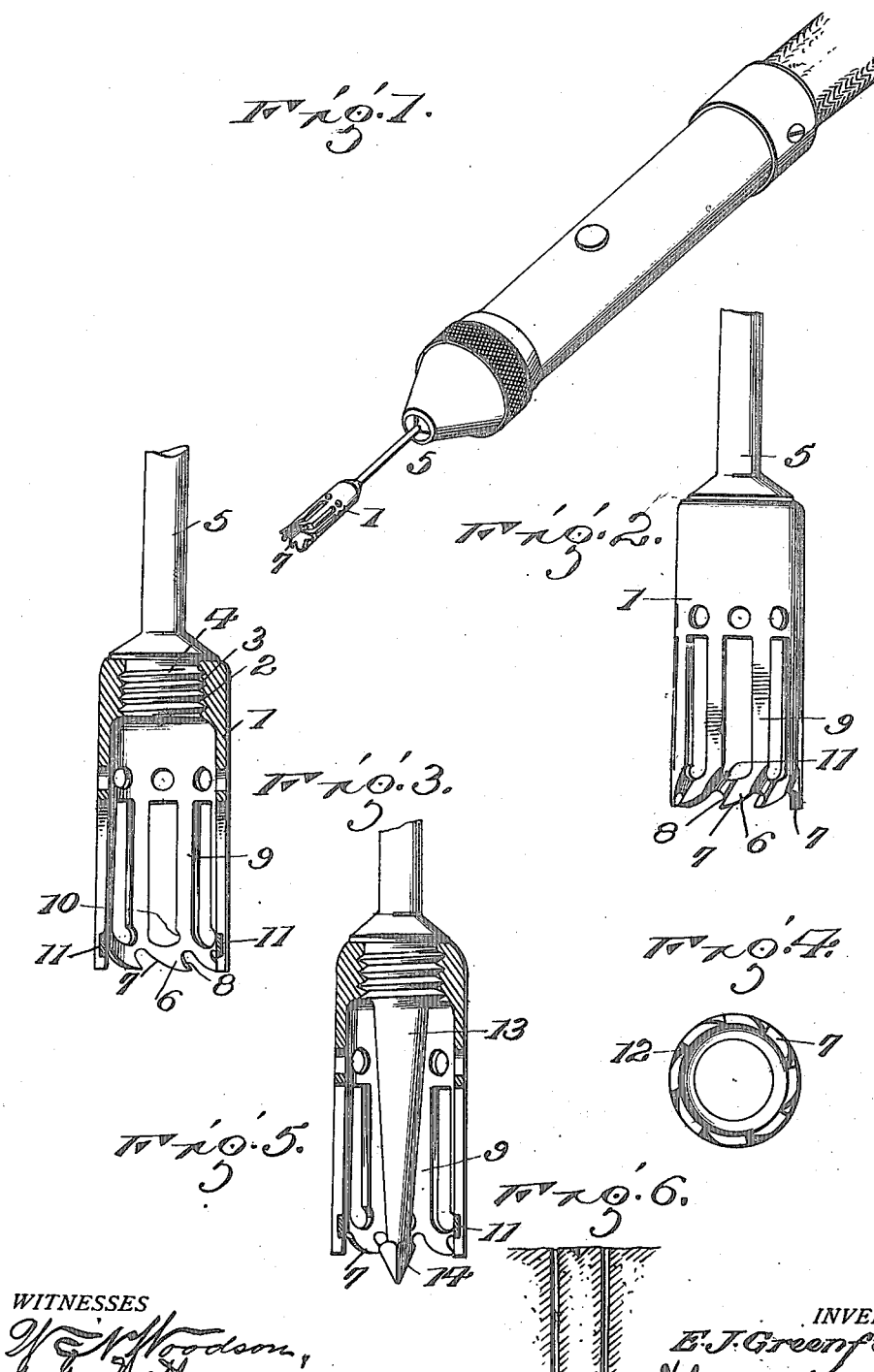

EDWIN J. GREENFIELD, OF WICHITA, KANSAS.

ANNULAR BONE-SAW.

1,123,730.   Specification of Letters Patent.   Patented Jan. 5, 1915.

Application filed September 13, 1912. Serial No. 720,217.

*To all whom it may concern:*

Be it known that I, EDWIN J. GREENFIELD, a citizen of the United States, residing at Wichita, in the county of Sedgwick and State of Kansas, have invented certain new and useful Improvements in Annular Bone-Saws, of which the following is a specification.

This invention relates to saws, and more particularly to rotary saws or trephines especially adapted for cutting a circular kerf in bone.

It is one aim of the invention to provide a saw for the purpose mentioned which will produce a clean cut so that the surface of the pillar and the wall of bone surrounding it will be free from irregularities, chips of the bone and tissue.

Incidentally, the invention aims to so construct the saw that the particles of bone and tissue removed during the sawing operation will be collected by the saw and will be removed from the cavity at the time of removal of the saw.

A further aim of the invention is to provide a saw of the class mentioned which will not be liable to chip or split the bone during the sawing operation and which will not be liable to wedge or bind.

For a full understanding of the invention reference is to be had to the following description and accompanying drawing, in which:—

Figure 1 is a perspective view illustrating the manner of using the saw embodying the present invention. Fig. 2 is a view in elevation of the saw. Fig. 3 is a vertical transverse sectional view therethrough Fig. 4 is a bottom-end view of the saw. Fig. 5 is a view similar to Fig. 3 illustrating the centering attachment for the saw. Fig. 6 is a sectional view through a portion of a bone to show the nature of the cut to be made by the saw.

In the drawing the saw is illustrated as consisting essentially of a hollow body 1 which is exteriorly and interiorly of frusto-conical form, the working or toothed end of the body being its major end. The wall of the body 1 at the upper or minor end thereof is threaded as at 3 to receive the threaded end 4 of the shank 5 which at its end is formed to fit within the chuck of a dental engine, as shown in Fig. 1 of the drawing. The wall of the body 1 is of a thickness slightly less than the width of the annular cavity which is to be formed in the jaw-bone.

The lower end edge of the wall 1 is formed with an annular series of teeth indicated in general by the numeral 6. Each of the teeth 6 has a slightly curved under side 7 and a concave upper side or edge 8, the points of the teeth being all presented in the same direction and being all located in the same plane. The wall of the body is further formed with an annular series of slots 9, the lateral walls of which are preferably parallel and at their lower ends these slots are extended laterally a short distance as at 10 in the direction of rotation of the saw.

By referring to Fig. 2 of the drawing it will be observed that the extended lower ends of the slots are located directly above the upper ends of the notches formed between the teeth and the outer surface of the wall 1 is formed with relatively shallow and short channels 11 which are slightly inclined and extend between the said lower ends of the slots and the upper ends of the respective notches.

Referring to Fig. 4 it will be observed that one wall of each of the channels 11 is beveled or inclined as at 12 so that each channel is of less depth at its side which is the foremost side in the direction of rotation of the saw, then at its opposite side.

In that form of the invention shown in Fig. 5, the head 4 of the shank 5 is formed with a centering point 13 which extends axially within the body 1 and has its working end beveled and sharpened to a point as at 14.

It will be observed that the extremity of the point 14 is located a slight distance beyond the plane occupied by the points of the teeth 6 so that in applying the saw equipped with the centering device, to a bone, the point 14 will enter the bone before the points of the teeth 6 contact with the surface thereof, it being understood that the centering device is employed solely for the purpose of centering the saw at the beginning of the sawing operation and that after the saw has entered the bone a very short distance the use of the centering device will be dispensed with.

As before stated, the body of the saw is exteriorly and interiorly frusto-conical and of greater diameter at its toothed or entering end than at its opposite end and for this reason, after an annular cut of the desired depth has been made in the bone the saw may be withdrawn without any likelihood of the pillar being broken off or pulled out, nor will the saw be liable to cling to the post.

It will also be apparent from the foregoing and from inspection of Fig. 2 of the drawing, that the particles of bone and tissue removed by each tooth of the saw, will pass up through the channel 11 which is located immediately in advance of the tooth and into the respective pocket or slot 9, so that when the saw is withdrawn from the cavity, the accumulated matter will also be removed.

Having thus described the invention what is claimed as new is:—

1. A bone saw having an annular series of teeth, and a pocket located above each tooth, the tool having a relatively shallow channel inclined downwardly and forwardly from the lower end of each pocket and in communication with the space in front of the respective tooth.

2. A bone saw having a series of teeth and having pockets communicating with the space between the teeth.

3. A bone saw including a hollow conical body having an annular series of teeth and a detachable centering point having its entering extremity projected beyond the plane occupied by the points of the teeth.

In testimony whereof I affix my signature in presence of two witnesses.

EDWIN J. GREENFIELD. [L. S.]

Witnesses:
  SAMUEL N. ACKER,
  J. D. YOAKLEY.